United States Patent [19]

Suzuki et al.

[11] Patent Number: 5,416,556
[45] Date of Patent: May 16, 1995

[54] CUSTOM MODE CONTROL APPARATUS IN A CAMERA

[75] Inventors: Shinichi Suzuki, Tokyo; Toshio Dobashi, Yokohama; Toshiaki Hozumi, Tokyo; Masaharu Hara, Kawasaki, all of Japan

[73] Assignee: Nikon Corporation, Tokyo, Japan

[21] Appl. No.: 190,212

[22] Filed: Feb. 1, 1994

Related U.S. Application Data

[63] Continuation of Ser. No. 826,532, Jan. 27, 1992, abandoned.

[30] Foreign Application Priority Data

Feb. 6, 1991 [JP]  Japan ................................ 3-035124

[51] Int. Cl.⁶ .............................................. G03B 13/36
[52] U.S. Cl. ...................................... 354/400; 354/442
[58] Field of Search ............... 354/442, 410, 412, 474, 354/475, 76, 289.1, 289.12, 400, 402, 403, 173.1

[56]  References Cited

U.S. PATENT DOCUMENTS

| | | | |
|---|---|---|---|
| 4,455,068 | 6/1984 | Izuhara | 354/412 |
| 4,728,978 | 3/1988 | Inoue et al. | 354/289.1 |
| 4,853,733 | 8/1989 | Watanabe et al. | 354/412 |
| 4,931,823 | 6/1990 | Nakajima et al. | 354/412 |
| 5,191,372 | 3/1993 | Aihara | 354/400 |

FOREIGN PATENT DOCUMENTS 57-99623  6/1982  Japan .

Primary Examiner—Russell E. Adams
Attorney, Agent, or Firm—Shapiro and Shapiro

[57] ABSTRACT

A custom mode control apparatus by which the user can arbitrarily set the custom mode comprises a first selection device for selecting the custom mode or the ordinary mode, a second selection device for selecting the setting or reproduction of the custom mode, a contents setting device for selecting the set contents indicated on an indicating portion when the setting of the custom mode is selected by the second selection device, thereby arbitrarily setting the contents of the custom mode, a memory device for memorizing the contents of the custom mode set by the contents setting device, and a reproducing device for bringing about a custom mode in which the contents of the custom mode memorized in the memory device are reproduced when the reproduction of the custom mode is selected by the second selection device.

7 Claims, 5 Drawing Sheets

CUSTOM MODE CONTROL APPARATUS IN A CAMERA

This is a continuation of application Ser. No. 826,532, filed Jan. 27, 1992, now abandoned.

BACKGROUND OF THE INVENTION

1. Field of the Invention

This invention relates to a custom mode control apparatus in a camera which can arbitrarily set the custom mode.

2. Related Background Art

Many cameras in recent years are provided with a CPU and therefore have multiple functions. However, on the part of the user, there are often demanded cameras which not only have multiple functions, but also have functions truly necessary to the user. As an example of the camera which meets such demand, a camera in which the user can arbitrarily set the shutter speed is disclosed in Japanese Laid-Open Patent Application No. 57-99623. This camera is such that a combination of aperture and shutter speed can be arbitrarily set relative to various exposure values by a pin board matrix. The pin board matrix is a device as shown in FIG. 2 of Japanese Laid-Open Patent Application No. 57-99623 wherein an aperture is formed in the figure of a matrix of aperture and shutter speed and a program graph is completed by a pin being inserted into the aperture. In this case, the user can arbitrarily set the program graph and can therefore freely set a combination of aperture and shutter speed for any exposure.

However, such a prior-art apparatus can set only the relation between shutter speed and aperture and also, the pin board matrix is very cumbersome to handle and is not easy to use.

SUMMARY OF THE INVENTION

The present invention has been made in view of the above-noted situation and an object thereof is to provide an apparatus which can easily set the custom mode as desired by the user.

In the custom mode control apparatus in a camera according to the present invention, the contents of the custom mode are arbitrarily set by a contents setting device and the setting is effected to such a state that the custom mode pre-memorized in the apparatus is brought about in accordance with set information.

DESCRIPTION OF THE PREFERRED EMBODIMENT

Figure 1:
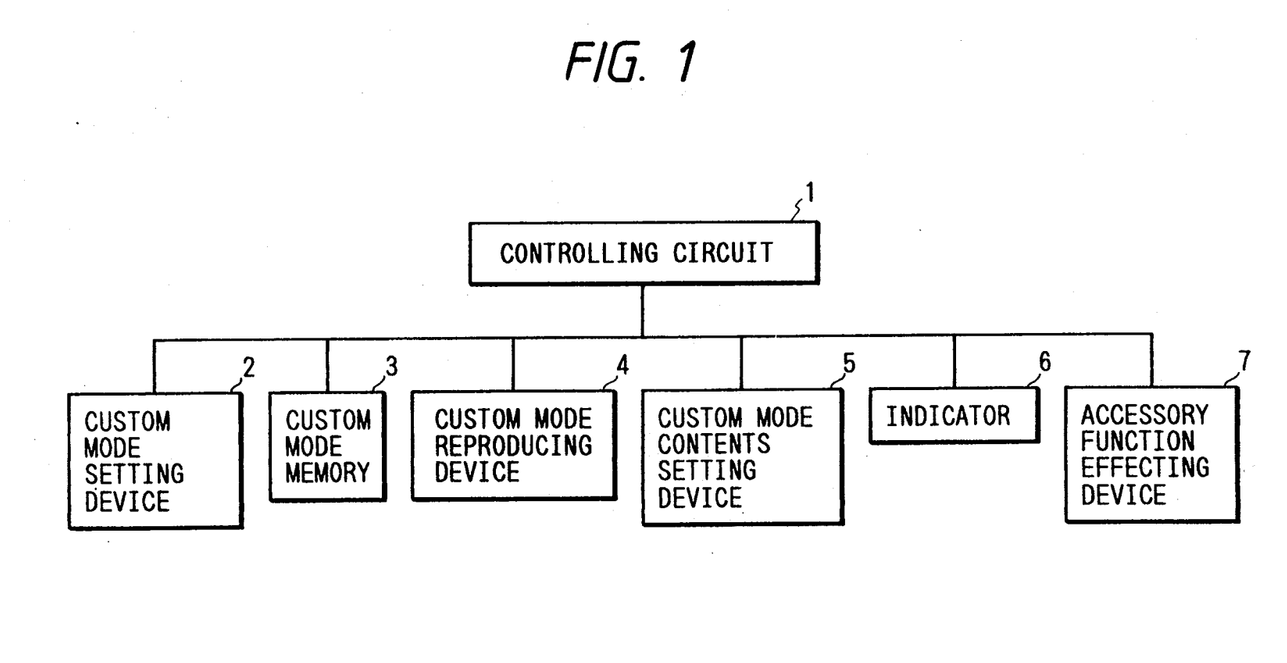
FIG. 1 is a block diagram showing an embodiment of the present invention.

FIG. 1 is a block diagram showing an embodiment of the present invention, which is comprised of a controlling circuit 1 comprising a CPU, a custom mode setting device 2, a custom mode memory device 3, a custom mode reproducing device 4, a custom mode contents setting device 5, an indicator 6 and an accessory function effecting device 7.

The custom mode setting device 2 is designed such that the user can arbitrarily set various contents such as an exposure control system, a film feeding system, a light metering system and a distance metering system. The custom mode memory device 3 is designed to memorize input contents and personal codes. The custom mode reproducing device 4 is designed to call memorized contents when a memorized personal code is input, thereby bringing about a state in which photographing can be effected. The custom mode contents setting device 5 is designed to selectively input and set the contents of the custom mode.

The accessory function effecting device 7 is provided with such function as distance metering mode selection, AF area selection, exposure control mode selection, program shift selection, light metering system selection, film feeding system selection and exposure correction selection.

Figures 2, 2A:
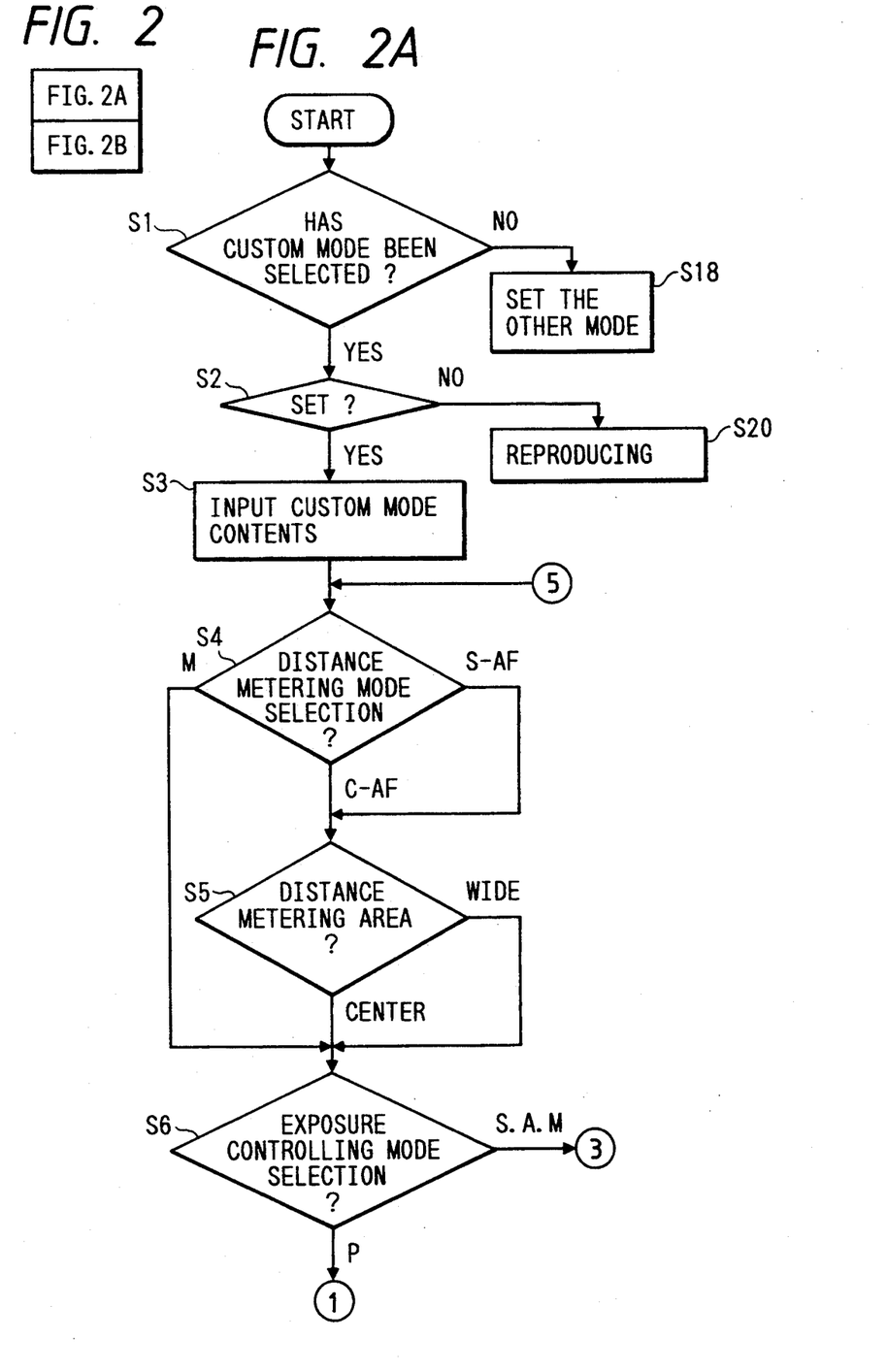
FIG. 2 is a flow chart illustrating the operation during setting.
Figure 2B:
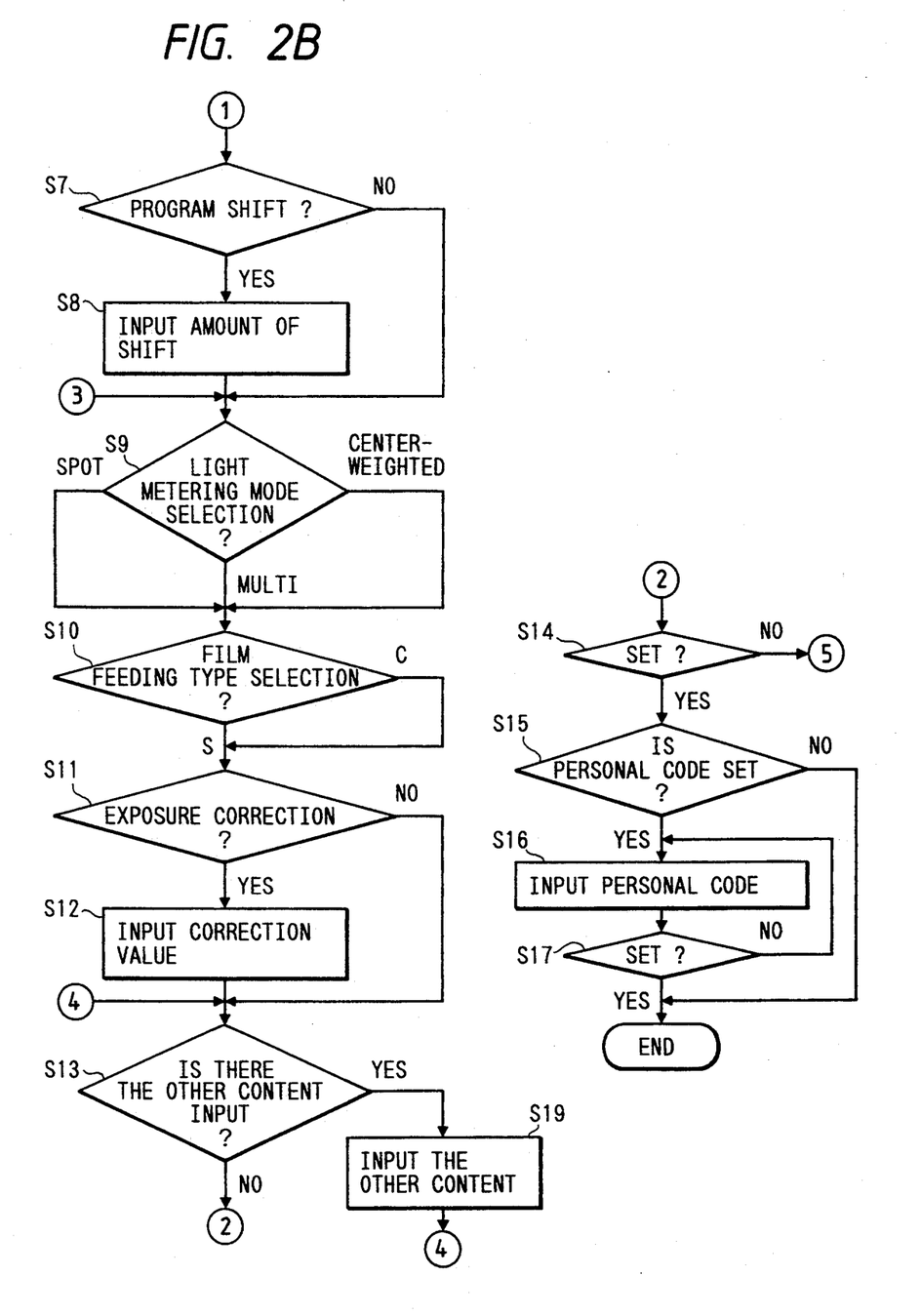

The operation of the thus constructed apparatus will now be described with reference to the flow charts of FIGS. 2 and 3. FIG. 2 shows a series of operations until the custom mode is set and memorized, and these operations are such that only a content which is the basis of photographing is input and the other contents are changed as required. The reason is that if all contents are input, the operation will become very cumbersome and the apparatus will become difficult to use.

First at a step S1, it is selected that now is the custom mode, and when at a step S2, it is selected that now is not the reproduction but the setting of the custom mode, at a step S3, necessary contents for making up the custom mode are successively input. The process of a step S20 when it is judged at the step S2 that now is the reproduction of the custom mode will be described later. Subsequently, at a step S4, one of single AF, continuous AF and manual focus is selected (single AF is to discontinue distance metering when the lens of the camera is once in focus to an object, and continuous AF has the function of continuing distance metering as long as the release button is half-depressed).

If at the step S4, AF is selected, whether the distance metering area is only the center or the range including the marginal area is selected at a step S5. After the necessary selection has been done at the steps S4 and S5, exposure control mode selection is done at a step S6, where one of P (program AE), S (shutter speed priority AE), A (aperture priority AE) and M (manual) is selected.

If at the step S6, P (program AE) is selected, whether program shift should be done is selected at a step S7, and if program shift should be done, the amount of shift is input at a step S8. Subsequently, at a step S9, one of multipattern light metering, center-weighted light metering and spot light metering is selected, and at a step S10, whether the film feeding system is single (one-frame photographing) or continuous (continuous photographing) is selected.

Subsequently, at a step S11, whether exposure correction should be done is selected, and if exposure correction should be done, a correction value is input at a step S12. If at a step S13, it is judged that there is the other content input, that content is input at a step S19, but if at the step S13, it is judged that there is not the other content input, whether the contents so far input may be memorized in the custom mode is judged at a step S14. If here is a hindrance, return is made to the step S4, where inputting is done over again.

Subsequently, if at a step S15, it is judged that a personal code should be memorized together in the memorized custom mode, the personal code is input at a step S16, and whether the personal code may be intactly memorized is judged at a step S17. If it may be memorized, it is memorized to terminate the process, and if there is a hindrance, the personal code is set again. If several users share a camera and one of the users does not want his custom mode to be used by the others, if he presets his personal code like a cash card, the personal code is necessary when he calls out the custom mode and therefore, there is no possibility of his custom mode being used by the others.

Figure 3:
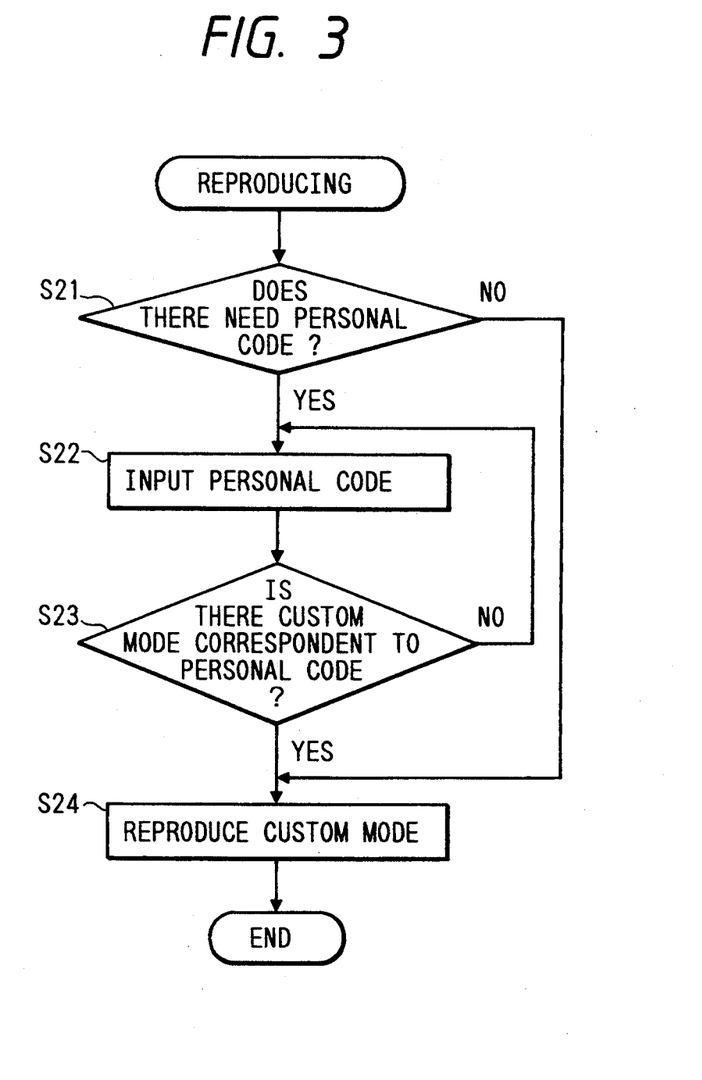
FIG. 3 is a flow chart illustrating the operation during reproduction.

FIG. 3 is a flow chart showing a series of operations for reproducing the custom mode memorized with the personal code, and shows the detailed process of a step S20 when it is judged at the step S2 of FIG. 2 that now is not the setting of the custom mode, that is, now is the reproduction of the custom mode. If at a step S21, it is judged that the personal code is necessary in the custom mode to be reproduced, the personal code is input at a step S22, and whether a custom mode corresponding to the input personal code is memorized is judged at a step S23, and if it is not memorized, the personal code is input once again, and if it is memorized, that custom mode is reproduced at a step S24.

Figure 4:
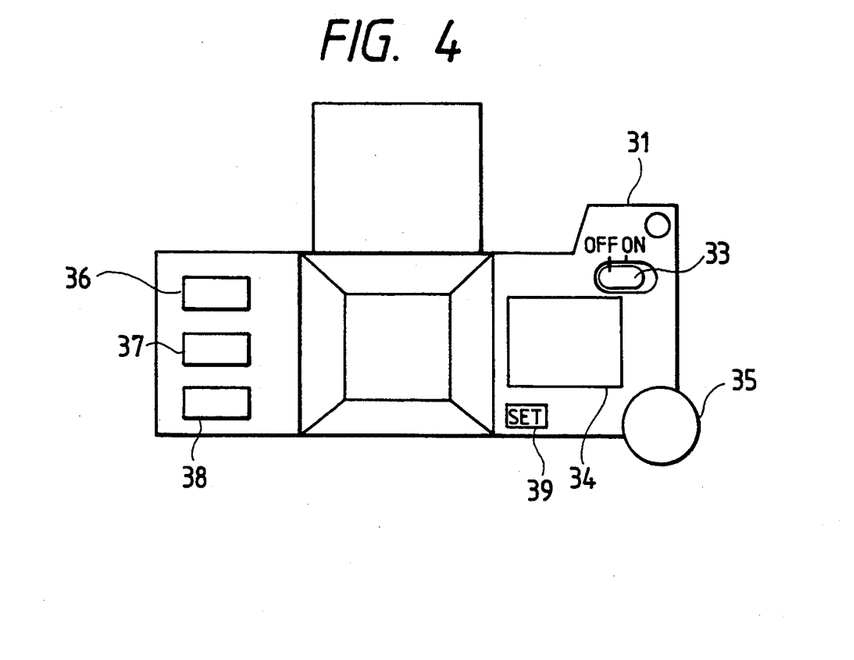
FIG. 4 is a plan view showing the operating portion and indicating portion of a camera.
Figure 5:
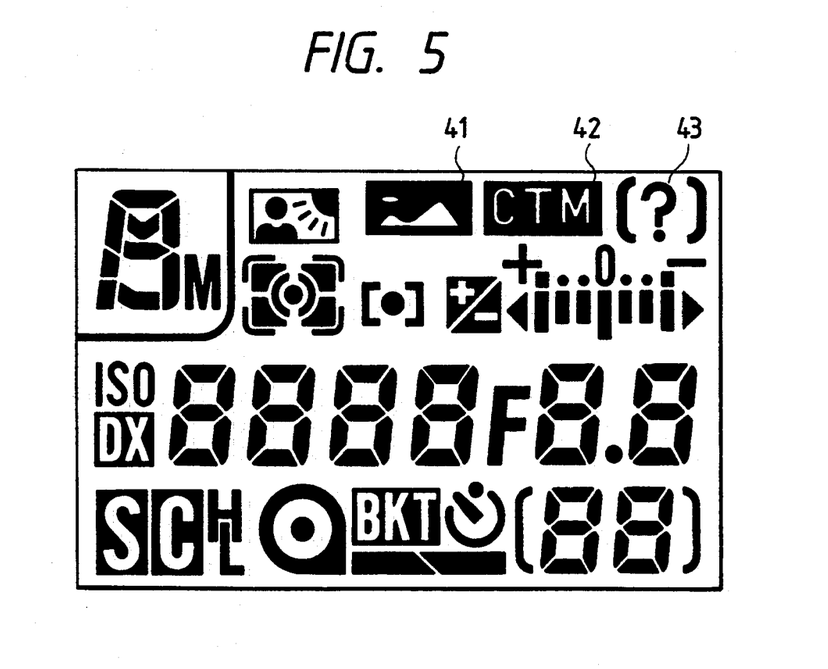
FIG. 5 shows the indicating portion on an enlarged scale.

FIG. 4 shows the operating and indicating portions in a camera body and FIG. 5 is an enlarged view of the indicating portion 34 of FIG. 4 when it is assumed that all the indicating portion has been turned on. The relations with the flow charts will now be described with reference to these figures. The power source switch 33 of the camera body 31 is first closed. When a mode button 36 (a button bearing the word "MODE") is depressed, there is brought about the custom mode selection state of the step S1 of FIG. 2, but this state is not brought about immediately after the mode button is depressed, but at first, the other mode setting state of the step S18 is brought about, and then the camera is set to the custom mode.

The reference numeral 41 in FIG. 5 designates an indication area for indicating the landscape mode, and when a dial 35 is turned while the mode button 36 of FIG. 4 is depressed, modes pre-contained in the camera such as a portrait, close-up photographing and sport are successively indicated. That is, the setting of the other mode of the step S18 is effected. When the dial 35 is further turned, the custom mode is selected and the step S1 assumes the state of YES, and the indication to the effect that now is the custom mode appears in an area designated by the reference numeral 42 in FIG. 5. When an input button 38 of FIG. 4 is then depressed, the setting at the step S2 assumes the state of YES. When the mode button is depressed again, there is brought about the state of reproduction which will be described later.

When in the set state, a function button 37 (a button bearing the word "FUNCTION") is depressed and the dial 35 is turned, the state changes from the state of the step S6 of FIG. 2 to the selection state of the step S16, and when that selection state should be settled, input button 38 is depressed. If that state may be set, when a set button 39 is depressed, the contents of the custom mode are memorized and the personal code becomes settable. If the personal code is not set, when the input button 38 is depressed when the indication of "?" designated by the reference numeral 43 in FIG. 5 is being done, the setting of the contents of the custom mode is terminated.

If here, the personal code is set, the indication of the personal code is "?" at first, but by the dial 35 being turned, letters and numbers are indicated, and when they should be settled, the input button 38 is depressed. The personal code is a combination of characters including four letters and a number of four figures, and the second and subsequent figures can also be set by the dial 35 and the input button 38. If the setting of the personal code is good, the set button 39 is depressed, and when the personal code is to be re-set, the user awaits for 10 seconds or longer without depressing the set button 39, whereby return is made to the personal code input state of the step S16.

What has been described above is the operation until the custom mode is set, and a description will now be given of the operation when the custom mode is reproduced. When at the step S2 of FIG. 2, the input button 38 is depressed twice, there is brought about the reproduction state. If the personal code is not memorized in the custom mode, the custom mode is immediately reproduced, and by the dial 35 being turned, custom modes which are not accompanied by the personal code are successively reproduced.

If the personal code is memorized in the custom mode, the personal code indication 43 becomes "?", and four figures are input by the dial 35 and the input button 38. If there is a corresponding custom mode, the custom mode is immediately reproduced. If at the step S23, a personal code to which any custom mode is not relevant is input by mistake, the custom mode is not reproduced and the personal code indication 43 becomes "?" and thus, the personal code is input again.

As described above, the present invention is designed so as to be capable of arbitrarily setting and reproducing the custom mode and therefore, when the user uses the apparatus, he can accomplish setting suited for the way of use simply by effecting selection, and this leads to the effect that snapshots can be secured and photo opportunity is not missed.

What is claimed is:

1. A custom mode control apparatus in a camera including:
    focusing means for performing an automatic focusing, said focusing means having at least a first automatic focusing mode and a second automatic focusing mode, wherein if once brought into focus in said first automatic focusing mode, said focusing means holds the in-focus state, and wherein a focus detection is continued in said second automatic focusing mode which is distinct from said first automatic focusing mode;
    exposure means for performing an exposure control, said exposure means having at least a first exposure control mode and a second exposure control mode which is distinct from said first exposure control mode, wherein a combination of shutter speed and aperture values is determined in accordance with a program in said first exposure control mode;
    memory means for storing said automatic focusing modes and said exposure control modes;
    mode selecting means for switching between a custom mode in which a photographer arbitrarily sets any of said automatic focusing and exposure control modes and an ordinary mode which has a predetermined photographing mode;

setting means for setting a specific automatic focusing mode from said automatic focusing modes or setting a specific exposure control mode from said exposure control modes so that a combination of an automatic focusing mode and an exposure control mode stored in said memory means is changed when said custom mode is selected by said mode selecting means;

reproducing means for reproducing a changed combination of said automatic focusing mode and said exposure control mode, which combination is changed by said setting means, and which combination is stored in said memory means; and control means for performing a photographing operation in accordance with said photographing mode when said ordinary mode is selected by said mode selecting means, and for performing a photographing operation in accordance with the changed combination of said automatic focusing mode and said exposure control mode when said reproducing means is enabled, which combination is reproduced by said reproducing means.

2. A custom mode control apparatus in a camera including:

focusing means for performing an automatic focusing, said focusing means having at least a first automatic focusing mode and a second automatic focusing mode, wherein if once brought into focus in said first automatic focusing mode, said focusing means holds the in-focus state, and wherein a focus detection is continued in said second automatic focusing mode which is distinct from said first automatic focusing mode;

exposure means for performing an exposure control, said exposure means having at least a first exposure control mode and a second exposure control mode which is distinct from said first exposure control mode, wherein a combination of shutter speed and aperture values is determined in accordance with a program in said first exposure control mode;

memory means for storing said automatic focusing modes and said exposure control modes;

mode selecting means for switching between a custom mode in which a photographer arbitrarily sets any of said automatic focusing and exposure control modes and an ordinary mode which has a predetermined photographing mode;

personal code setting means which is able to set a personal code when said custom mode is selected by said mode selecting means;

setting means for setting a specific automatic focusing mode from said automatic focusing modes or setting a specific exposure control mode from said exposure control modes so that a combination of an automatic focusing mode and an exposure control mode stored in said memory means is changed, while said personal code set by said personal code setting means is stored;

reproducing means for reproducing a changed combination of said automatic focusing mode and said exposure control mode, which combination is set by said setting means and stored in said memory means, through a detection of said personal code; and control means for performing a photographing operation in accordance with said photographing mode when said ordinary mode is selected by said mode selecting means, and for performing a photographing operation in accordance with the changed combination of said automatic focusing mode and said exposure control mode when said reproducing means is enabled, which combination is reproduced by said reproducing means.

3. A custom mode control apparatus in a camera including:

(a) a control system for directing various controls;

(b) an accessory system including a focusing system and an exposure system and connected to said control system so that said focusing and exposure systems are controlled by said control system, said focusing system being constructed for performing an automatic focusing and having at least a first automatic focusing mode and a second automatic focusing mode, wherein if once brought into focus in said first automatic focusing mode, said focusing system holds the in-focus state, and wherein a focus detection is continued in said second automatic focusing mode which is distinct from said first automatic focusing mode, said exposure system being constructed for performing an exposure control and having at least a first exposure control mode and a second exposure control mode which is distinct from said first exposure control mode, wherein a combination of shutter speed and aperture values is determined in accordance with a program in said first exposure control mode;

(c) a memory system connected to said control system for changing stored contents in accordance with a control of said control system, wherein said stored contents are said automatic focusing modes and said exposure control modes;

(d) a setting system having an externally operative setting member and outputting a control signal to said control system when said setting member is operated, wherein said setting system sets a specific automatic focusing mode from said automatic focusing modes stored in said memory system or sets a specific exposure control mode from said exposure control modes stored in said memory system in accordance with said control signal from said setting system so that a combination of an automatic focusing mode and an exposure control mode stored in said memory system is changed;

(e) a reproducing system having an externally operative reproducing member and outputting a control signal to said control system when said reproducing member is operated, wherein said reproducing system reproduces a changed combination of said automatic focusing mode and said exposure control mode in accordance with said control signal from said reproducing system, which combination is set by said setting system and stored in said memory system; and (f) a photographing control system connected to said control system, wherein said photographing control system performs a photographing operation in accordance with the combination before changing of said automatic focusing mode and said exposure control mode prior to an operation of said reproducing member, while said photographing control system performs a photographing operation in accordance with the changed combination of said automatic focusing mode and said exposure control mode stored in said memory system after the operation of said reproducing member.

4. A custom mode control apparatus in a camera including:
   (a) a control system being constructed for directing various controls;
   (b) an accessory system including a focusing system and an exposure system and connected to said control system so that said focusing and exposure systems are controlled by said control system,
   said focusing system being constructed for performing an automatic focusing and having at least a first automatic focusing mode and a second automatic focusing mode, wherein if once brought into focus in said first automatic focusing mode, said focusing system holds the in-focus state, and wherein a focus detection is continued in said second automatic focusing mode which is distinct from said first automatic focusing mode,
   said exposure system being constructed for performing an exposure control and having at least a first exposure control mode and a second exposure control mode which is distinct from said first exposure control mode, wherein a combination of shutter speed and aperture values is determined in accordance with a program in said first exposure control mode;
   (c) a memory system connected to said control system for changing stored contents in accordance with a control of said control system, wherein said stored contents are said automatic focusing modes and said exposure control modes;
   (d) a setting system having an externally operative setting member and outputting a control signal to said control system when said setting member is operated, wherein said setting system sets a specific automatic focusing mode from said automatic focusing modes stored in said memory system or sets a specific exposure control mode from said exposure control modes stored in said memory system in accordance with said control signal from said setting system;
   (e) an input system having an externally operative inputting member and outputting a control signal to said control system when said inputting member is operated, said input system storing said modes set by said setting system into said memory system in accordance with said control signal from said input system so that a combination of said automatic focusing mode and said exposure control mode stored in said memory system is changed;
   (f) a reproducing system having an externally operative reproducing member and outputting a control signal to said control system when said reproducing member is operated, wherein said reproducing system reproduces a changed combination of said automatic focusing mode and said exposure control mode in accordance with said control signal from said reproducing system, which combination is set by said setting system and stored in said memory system; and
   (g) a photographing control system connected to said control system, wherein said photographing control system performs a photographing operation in accordance with the combination before changing of said automatic focusing mode and said exposure control mode prior to an operation of said reproducing member, while said photographing control system performs a photographing operation in accordance with the changed combination of said automatic focusing mode and said exposure control mode stored in said memory system after the operation of said reproducing member.

5. A custom mode control apparatus in a camera including:
   (a) a control system for directing various controls;
   (b) an accessory system including a focusing system, an exposure system and a film feeding system and connected to said control system so that said focusing, exposure and film feeding systems are controlled by said control system,
   said focusing system being constructed for performing an automatic focusing and having at least a first automatic focusing mode and a second automatic focusing mode, wherein if once brought into focus in said first automatic focusing mode, said focusing system holds the in-focus state, and wherein a focus detection is continued in said second automatic focusing mode which is distinct from said first automatic focusing mode,
   said exposure system being constructed for performing an exposure control and having at least a first exposure control mode and a second exposure control mode which is distinct from said first exposure control mode, wherein a combination of shutter speed and aperture values is determined in accordance with a program in said first exposure control mode,
   said film feeding system being constructed for performing a film winding and having at least a single feeding mode in which a film is wound by one-frame and a continuous feeding mode in which a film is continuously wound;
   (c) a memory system connected to said control system for changing stored contents in accordance with a control of said control system, wherein said stored contents are said automatic focusing modes, said exposure control modes and said feeding modes;
   (d) a setting system having an externally operative setting member and outputting a control signal to said control system when said setting member is operated, wherein said setting system sets a specific automatic focusing mode from said automatic focusing modes stored in said memory system or sets a specific exposure control mode from said exposure control modes stored in said memory system or sets a specific feeding mode from said feeding modes stored in said memory system in accordance with said control signal from said setting system;
   (e) an input system having an externally operative inputting member and outputting a control signal to said control system when said inputting member is operated, said input system storing said modes set by said setting system into said memory system in accordance with said control signal from said input system so that a combination of said automatic focusing mode, said exposure control mode and said feeding mode stored in said memory system is changed;
   (f) a reproducing system having an outside operative reproducing member and outputting a control signal to said control system when said reproducing member is operated, wherein said reproducing system reproduces a changed combination of said automatic focusing mode, said exposure control mode and said feeding mode in accordance with a control signal from said reproducing system, which combination is set by said setting system and stored in said memory system; and (g) a photographing control system connected to said control system, wherein said photographing control system performs a photographing operation in accordance with the combination before changing of said automatic focusing mode, said exposure control mode and said feeding mode prior to an operation of said reproducing member, while said photographing control system performs a photographing operation in accordance with the changed combination of said automatic focusing mode, said exposure control mode and said feeding mode stored in said memory system after the operation of said reproducing member.

6. A custom mode control apparatus according to claim 5, wherein said accessory system further has a light metering system which has at least a first light metering mode and a second light metering mode, said first light metering mode being a center-weighted light metering and said second light metering mode being a spot-weighted light metering.

7. A custom mode control apparatus in a camera including:

focusing means for performing an automatic focusing, said focusing means having at least a first automatic focusing mode and a second automatic focusing mode, wherein if once brought into focus in said first automatic focusing mode, said focusing means holds the in-focus state, and wherein a focus detection is continued in said second automatic focusing mode which is distinct from said first automatic focusing mode;

exposure means for performing an exposure control, said exposure means having at least a first exposure control mode and a second exposure control mode which is distinct from said first exposure control mode, wherein a combination of shutter speed and aperture values is determined in accordance with a program in said first exposure control mode;

film feeding means for performing a film winding and having at least a single feeding mode in which a film is wound by one-frame and a continuous feeding mode in which a film is continuously wound;

memory means for storing said automatic focusing modes, said exposure control modes and said feeding modes;

setting means for setting a specific automatic focusing mode from said automatic focusing modes stored in said memory means, setting a specific exposure control mode from said exposure control modes stored in said memory means or setting a specific feeding mode from said feeding modes stored in said memory means;

input means for making said memory means store said modes set by said setting means so that a combination of said automatic focusing mode, said exposure control mode and said feeding mode stored in said memory means is changed;

reproducing means for reproducing a changed combination of said automatic focusing mode, said exposure control mode and said feeding mode, which combination is set by said setting means and stored in said memory means; and control means for performing a photographing operation in accordance with the combination before changing of said automatic focusing mode, said exposure control mode and said feeding mode stored in said memory means prior to an operation of said reproducing means, said control means performing a photographing operation in accordance with the changed combination of said automatic focusing mode, said exposure control mode and said feeding mode stored in said memory means after the operation of said reproducing means.

* * * * *